F. L. WILLIAMS.
NUT-LOCKS.
No. 190,398.  Patented May 1, 1877.
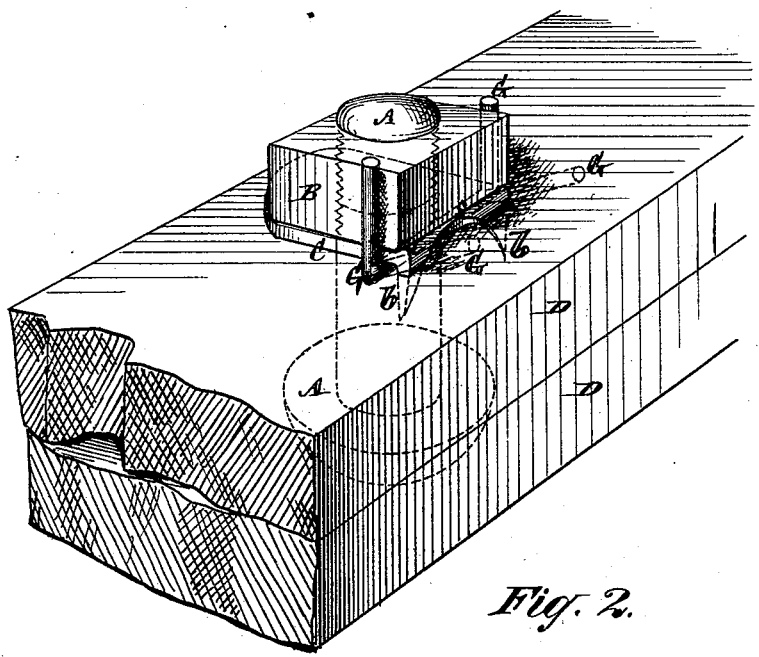
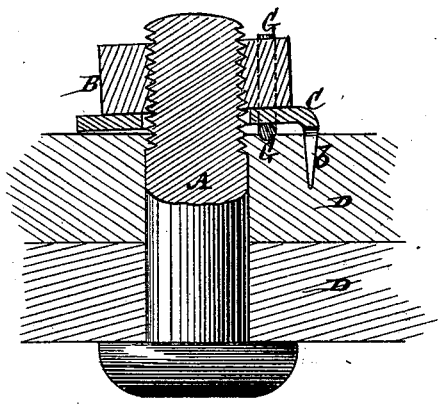
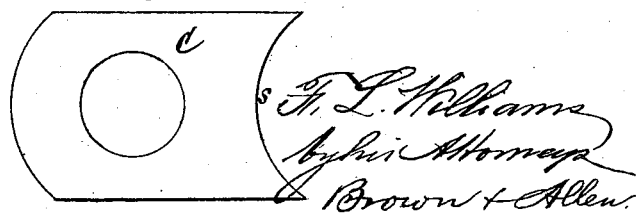

UNITED STATES PATENT OFFICE.

FRANK L. WILLIAMS, OF TAMAROA, ILLINOIS.

IMPROVEMENT IN NUT-LOCKS.

Specification forming part of Letters Patent No. 190,398, dated May 1, 1877; application filed April 3, 1877.

*To all whom it may concern:*

Be it known that I, FRANK L. WILLIAMS, of Tamaroa, in the county of Perry and State of Illinois, have invented a new and useful Improvement in Nut-Locks, of which the following is a description, reference being had to the accompanying drawing, which forms a part of this specification.

This invention consists in a nut-lock for bolts in which a washer formed with one or more holding projections or spurs has combined with it a wire which is placed crosswise under the washer, and has its ends bent up or out to embrace the nut at its sides within it.

Of course said nut-lock may be applied to various purposes; but it is here shown, by way of illustration, as used in connection with a bolt for holding two plates or boards together.

Figure 1 is a view, in perspective, of such an application of the nut-lock; Fig. 2, a section of the same in direction of the length of the bolt; and Figs. 3 and 4, a side view and plan view, respectively, of the bent wire and washer portions of the nut-lock prior to the bending of the ends of the washer on its one or cut-away side.

A is the bolt; B, the nut, and C, the washer. D D are the boards or plates, held together by the bolt.

The washer C is hollowed out or cut away on one side, *s*, and the ends of said side bent to form angular-pointed projections or spurs *b b*, which are made to enter the plate or board D at the screw end of the bolt. Beneath this washer, on one side of the bolt, is placed a cross-wire, G, which has its ends bent up or out so that they extend on opposite sides of the washer and nut, and so that by the hold of the washer on the wire, after the nut has been screwed to its place, the wire and washer effectually serve to prevent any loosening or detachment of the bolt and nut. To put the nut B on and off the bolt, it is only necessary to turn the wire G so that its bent ends clear the nut, as represented by dotted lines in Fig. 1.

Instead of the washer being made as described, it may be of an oblong form and be made of cast-iron, with a single teat or holding-spur on its under side near its one end, and a transverse groove in its under side and near its other end, on the reverse side of the bolt of the nut, to receive within it the cross-wire having its ends bent or turned up to embrace the nut; or, again, the washer may be made round, and have duplicate spurs formed by cutting slots or holes in it, but leaving the metal of such cut portions attached on their one end to the body of the washer, and afterward bending down or out such attached cut portions to form the spurs. When thus constructed, the cross-wire which embraces the nut may have its bent ends passed up through the slots or holes left in forming the spurs, as described.

I claim—

A nut-lock consisting of a washer, C, constructed with one or more pointed projections or spurs, *b*, and a wire, G, placed crosswise under the washer, and having its end bent up or out, for use in relation with the nut, substantially as shown and described.

FRANK L. WILLIAMS.

Witnesses:
   C. M. HUGHEY,
   D. C. BARBER, Jr.